United States Patent [19]

Russell

[11] Patent Number: 4,495,609

[45] Date of Patent: Jan. 22, 1985

[54] RECORDING AND PLAYBACK SYSTEM

[75] Inventor: James T. Russell, Richland, Wash.

[73] Assignee: Digital Recording Corporation, Wilton, Conn.

[21] Appl. No.: 324,128

[22] Filed: Nov. 23, 1981

Related U.S. Application Data

[62] Division of Ser. No. 935,152, is a division of Ser. No. 556,780, Mar. 10, 1975, abandoned.

[51] Int. Cl.³ .......................... G11B 7/08; G11B 7/12; H04N 5/84
[52] U.S. Cl. ...................................... 369/44; 358/347; 369/59; 369/60; 369/96; 369/97
[58] Field of Search ................. 358/335, 342, 345-348; 369/59-60, 96-97, 44-46, 120-121; 360/7, 9.1-10.3; 346/76 L, 108

[56] References Cited

U.S. PATENT DOCUMENTS

| 2,510,121 | 6/1950 | Lehmann et al. | 369/97 |
|---|---|---|---|
| 3,154,370 | 10/1964 | Johnson | 358/347 |
| 3,226,696 | 12/1965 | Dove | 358/347 |
| 3,234,326 | 2/1966 | Goldmark et al. | 358/348 |
| 3,283,068 | 11/1966 | Urry et al. | 360/9.1 |
| 3,314,075 | 4/1967 | Becker | 346/108 |
| 3,501,586 | 3/1970 | Russell | 358/348 |
| 3,534,166 | 10/1970 | Korpel | 369/121 |
| 3,544,718 | 12/1970 | Adler | 358/338 |
| 3,809,806 | 5/1974 | Walker et al. | 358/348 |
| 3,823,276 | 7/1974 | Maslowski et al. | 369/97 |
| 3,854,015 | 12/1974 | Janssen | 358/342 |
| 3,856,987 | 12/1974 | McMann et al. | 358/348 |
| 3,898,629 | 8/1975 | Westerberg | 369/97 |

Primary Examiner—Raymond F. Cardillo, Jr.
Attorney, Agent, or Firm—Klarquist, Sparkman, Campbell, Leigh & Whinston

[57] ABSTRACT

Recording and playback optical scanners are relatively movable with respect to each other and with respect to a movable recording medium such as reel of tape adapted for recording variations in applied light. The playback scanner reproduces recorded information at a time delayed with respect to the time of recording, wherein the amount of delay can vary within wide limits. When the playback scanner is moved relative to recording scanner, the playback rate will be faster or slower than the recording rate.

27 Claims, 12 Drawing Figures

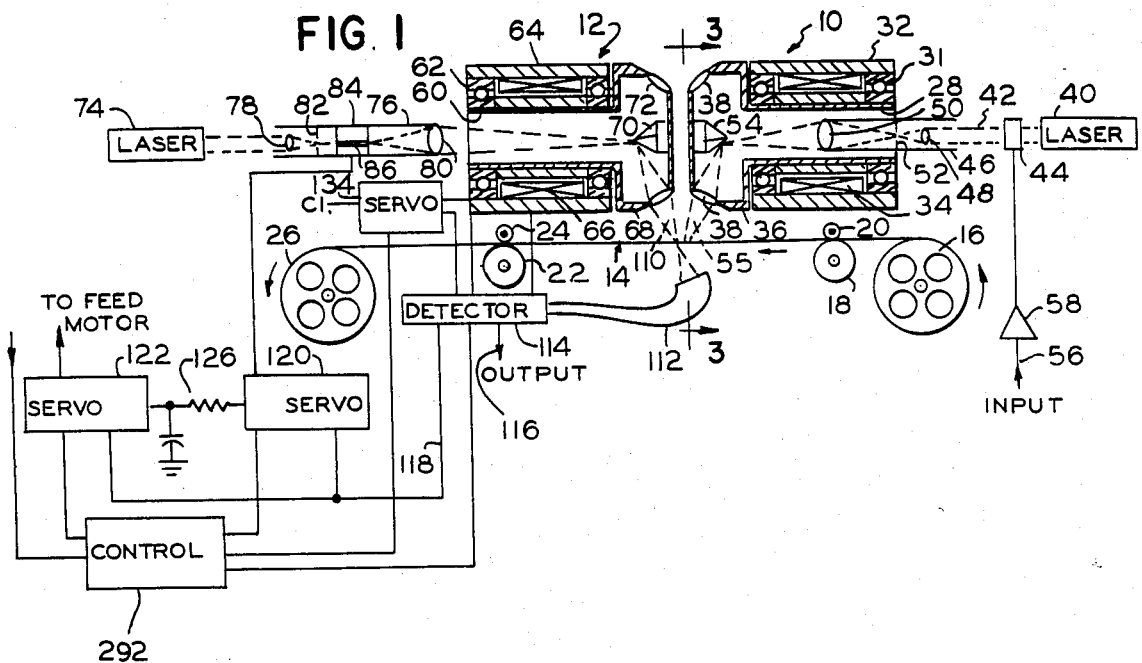

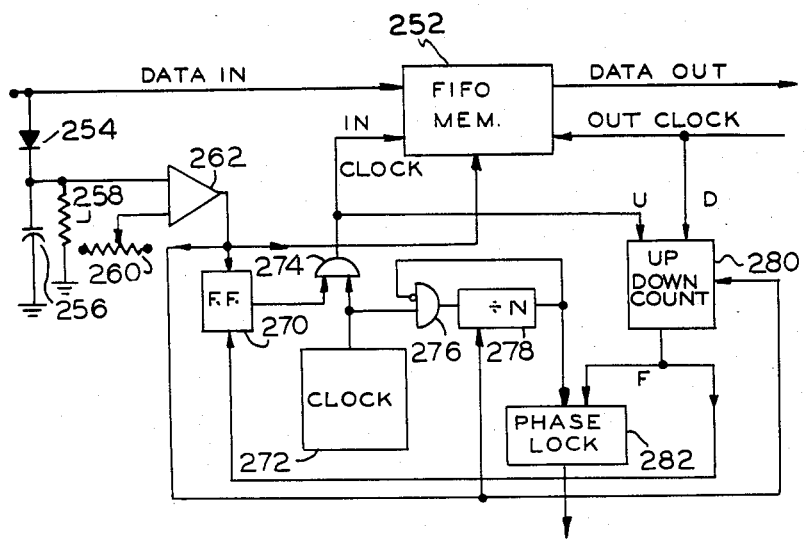
FIG. 8
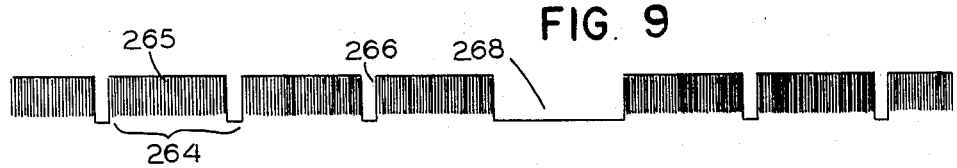
FIG. 9
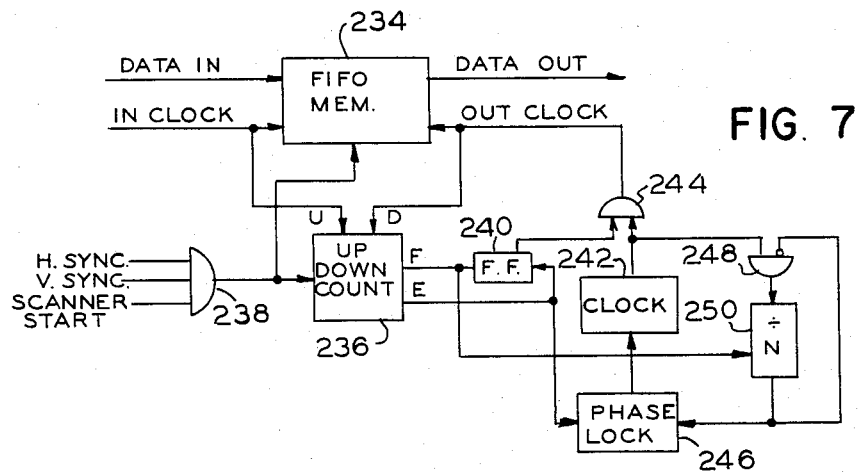
FIG. 7
FIG. 10
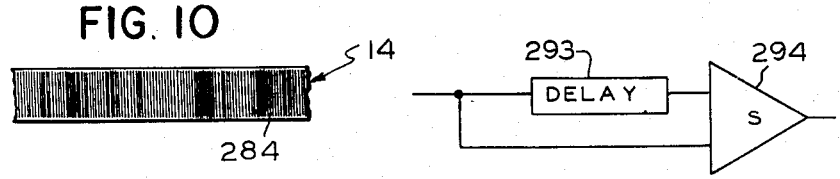
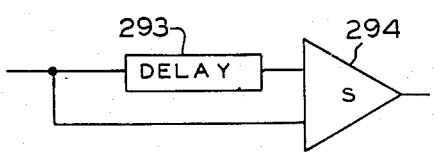
FIG. 11

RECORDING AND PLAYBACK SYSTEM

CROSS REFERENCE TO RELATED APPLICATION

This is a division of application Ser. No. 935,152 filed Aug. 21, 1978 for RECORDING AND PLAYBACK SYSTEM, now U.S. Pat. No. 4,320,488 issued Mar. 16, 1982 which was a division of application Ser. No. 556,780, filed Mar. 10, 1975 for RECORDING AND PLAYBACK SYSTEM, now abandoned.

BACKGROUND OF THE INVENTION

Frequent need arises for bringing about relative synchronization between different sources of information. For example, it often happens that a TV program source is, say, one-half field later than another, and/or the time relationship may drift slowly. At present there is no way to correct the difference so that different sources can be used on the same program. Moreover, there are several TV standards in the world. U.S. and Japan use 525 lines, 60 fields per second, the NTSC standard. In Europe, a common system is the 625 lines, 50 fields system of PAL. A simple system does not exist for converting from one frequency standard to another.

Also, systems employed for delayed broadcast or "stop action" can be relatively complicated and costly, as when magnetic recording and playback apparatus is employed. Moreover, with magnetic recording and playback, generally a minimum delay is required between recording and playback so that the respective recording and playback heads can be physically accommodated along the magnetic recording medium.

SUMMARY OF THE INVENTION

According to the present invention, first and second optical means are disposed relative to a record medium suitable for receiving and recording electromagnetic information. The first optical means records the information via a first optical path, and the second optical means reads the recorded information via a second optical path. These optical means have a predetermined simultaneous relationship with respect to the recording medium, and means are employed for coordinating the first and second optical means for simultaneous operation. Thus, the second optical means may read out information at a predetermined delayed time after recording takes place, or means may provide relative movement between the first and second optical means whereby the reading rate is different from the recording rate.

The first and second optical means suitably comprise optical scanners simultaneously disposed with respect to a recording medium which is recorded upon by a recording light means and which rapidly records the information for playback.

The optical scanners suitably produce tracks of information across the moving recording medium wherein the scanned information is broken into recording lines extending across the recording medium. Electronic means is suitably provided for supplying an overscan gap between lines, i.e. to and from the edge of the recording medium, wherein data is compressed while recording into lines and thus expanded for readout at a predetermined rate.

It is therefore an object of the present invention to provide an improved system for delayed playback of recorded information.

Another object of the present invention is to provide improved means for recording and playback of information at different rates.

A further object of the present invention is to provide improved means for recording and delayed playback of information wherein the relative delay can vary over wide limits.

It is a further object of the present invention to provide an improved system for transcoding between different coding standards.

A further object of the present invention is to provide an improved system for delayed playback of information, and for "stop action" of information.

Another object of the present invention is to provide an improved system for indexing and editing recorded information.

A further object of the present invention is to provide an improved system for recording information in recording lines having a scanning gap therebetween wherein information is expanded for readout into a continuous stream.

The present invention, both as to organization and method of operation, together with further advantages and objects thereof can best be understood in reference to the following description taken in connection with the accompanying drawings wherein like reference characters refer to like elements.

DRAWINGS

FIG. 1 is a schematic side view, prtially in cross section, of recording and playback apparatus according to the first embodiment of the present invention;

FIG. 2 is a plan view of the FIG. 1 apparatus;

FIG. 3 is a view of recording scanner according to the FIG. 1 apparatus, the view being taken at 3—3 in FIG. 1;

FIG. 7 is a block diagram of electronic circuitry suitably employed in recording information according to the present invention;

FIG. 8 is a block diagram of electronic circuitry for playback of information according to the present invention;

FIG. 9 is a diagram illustrating the wave form of typical recorded information;

FIG. 10 is a plan view of a recording medium according to the present invention;

FIG. 11 is a block diagram of an additional circuit which may be used in a television transcoding operation.

DETAILED DESCRIPTION

Figure 4:
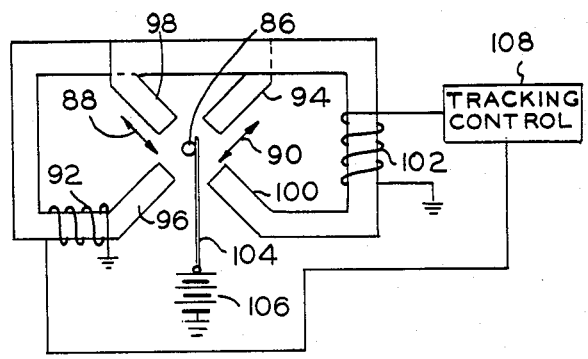
FIG. 4 is a schematic view of an optical deflection device employed in the present invention.

Referring to the drawings and particularly to FIGS. 1 through 3, an apparatus according to the present invention includes a first optical scanner 10 and a second optical scanner 12 which are adapted to scan beams of electromagnetic energy, e.g. light beams, across a record medium 14. A record medium 14 is suitably a tape unreeled from reel 16, passing between capstan rollers 18, 20 and 22, 24 in the direction of the arrow, and received onto a pickup reel 26. Capstan rollers 18 and 22 are respectively empowered by servo motors 28 and 30 (see FIG. 2), and have a contoured surface for "dishing" a record medium 14, as illustrated in FIG. 3, whereby the light beam from scanner 10 can be accurately focused upon the record medium.

The record medium should be self-developing. There are several classes of photosensitive materials that are satisfactory, i.e., dry silver, free-radical, vesicular (Kalvar), thermal destruction (melt or vaporise), and photochromic. The dry silver and free-radical systems require a futher treatment of heat if a permanent record is desired. Hence, for these materials a heating element (not shown) is employed subsequent to recording by means of scanner 10. The various rapid light recording media are known by those skilled in the art.

Scanner 10 suitably comprises a metal cylinder 28 journaled in bearings 31 supported in turn by an outer cylindrical body 32 which also supports motor coils 34. Hence, the cylindrical body 28 forms the motor of a motor such as a synchronous hysteresis type.

Upon one end of cylinder 28 is secured a head 36 which rotates and carries a plurality of objective lenses 38 around the forward periphery thereof. As illustrated in FIG. 3, six evenly spaced objective lenses 38 may be located at the forward end of head 36 and disposed in an angular forward wall of the head for scanning across the record medium 14 as the cylinder 28 is rotated about its axis which is parallel to the direction of motion of the record medium 14.

The light for scanner 10 is provided by a laser 40 positioned axially forward of the scanner 10 and adapted for projecting a beam of light 42 substantially along the axis of the scanner through a modulator 44 to an optical tube 46 which is suitably located partially within cylinder 28. The optical tube 46 includes lenses 48 and 50 and a pinhole aperture 52 therebetween. Lens 50 directs light from the pinhole upon a pyramidal shaped mirror 54 which is secured to the forward end of head 36 and functions to direct the light to the lenses 38 in succession as head 36 rotates. Thus, since six objective lenses 38 are located in head 36, pyramidal mirror 54 is formed with six facets, each of which successively reflects light to a lens 38 for scanning a light beam 55 across record medium 14.

The light beam is imaged to a narrow track across the record medium 14. Thus, the recording track is about one micron in width, and the spacing between track centers, as the recording medium 14 is moved longitudinally, is about three microns. The total length of track required depends upon the bandwidth and recording format selected. With a firm having a width of approximately two inches, about 4.5 inches of record medium per minute is required for television recording or about eleven feet per thirty minute period. a 1000 foot reel of record film would last about two days. This recording density represents an improvement of more than one hundred as compared with the recording density for television information on magnetic tape, for example.

The recording apparatus according to the present invention generally contemplates digital recording of information wherein modulator 44 is either in an on condition or an off condition as controlled by a binary type input on lead 56 coupled via amplifier 58 to the modulator. In such case, the recording is from the type set forth in my U.S. Pat. No. 3,501,586 granted Mar. 17, 1970, and entitled "Analog to Digital to Optical Photographic Recording and Playback System", wherein information is expressed in digital spots. However, the apparatus according to the present invention may also suitably record analog information wherein an analog input is received on lead 56.

According to this embodiment of the present invention, a second or reading scanner 12 is disposed along the record medium 14 for reading out the recorded information at a variably preselected time after the same is recorded on the medium. The second scanner 12 is substantially identical to the recording scanner and includes a cylinder 60 journaled in bearings 62 secured to an outer cylindrical member 64 which also supports motor coils 66. A head 68 supports pyramidal mirror 70 at the forward end thereof for directing light through a plurality of objective lenses 72 positioned in a forward angular wall of the head. The number of lenses 72 may be the same as the number of lenses 38 in the recording scanner, i.e. six, in the instance of the particular example.

A playback laser 74 directs a beam of light through an optical tube 76 disposed along the axis of scanner 12 and including lenses 78 and 80 and a pinhole aperture 32 located therebetween. Lens 80 directs the beam from the pinhole aperture to the pyramidal mirror 70 for successively directing the light beam toward the particular objective lens 72 which is tracing across the record medium 14.

In the case of tube 76, a further deflection device 84 is housed between the pinhole aperture 82 and lens 80. This deflection device is further disclosed and claimed in my co-pending application Ser. No. 522,702 filed Nov. 11, 1974, and entitled "Optical Fiber Deflection Device (now U.S. Pat. No. 3,941,927 granted Mar. 2, 1976). A typical embodiment is illustrated herein in FIG. 4. Light is directed from lens 78, FIG. 1, axially along an optical fiber 86 which is shown in end view in FIG. 4. It is desirable to deflect the optical fiber 86 in mutually perpendicular directions indicated by arrows 88 and 90. A first coil 92 is disposed upon a first magnetic metal core, the ends of which form pole pieces 94 and 96 on opposite sides of optical fiber 86. A further metal magnetic core has pole pieces 98 and 100 located on either side of the optical fiber, along a direction orthogonal to the first set of pole pieces, while a coil 102 is disposed around the second magnetic metal core. The optical fiber 86 is made of light transparent glass or plastic and is provided with coating of metal or other conducting material which is electrically connected at one end by a load wire 104 to a battery 106, and the opposite terminal of which is grounded. The opposite end of the coating on the optical fiber is also grounded so a current flows therealong. First ends of the coils 98 and 102 are connected to a tracking control 108 which controllably provides current through the coils for deflecting the optical fiber 86 to the desired extent. In this manner, the exact positioning of the light beam passing through lenses 72 onto the record medium 14 can be controlled. Other deflection structures are disclosed in the aforementioned application Ser. No. 522,702, and moreover, a servo controlled mirror device or light refracting plate, servo controlled by a galvanometer movement or the like, can be also utilized. The purpose of this structure, which will hereinafter more fully appear, is in the first instance for tracking the light beam 110 along the particular recorded track across the record medium 14.

As the beam 110 tracks along the line or track of record information, a variable amount of light will be transmitted through the record medium 14, the intensity of laser 74 being such that it will not produce further recording. The transmitted light is picked up by fiber optic light collector tube 112 which extends along under the path of the light beam 110 and conveys the light to detector 114 which includes photoelectric means for providing an output indicated at 116. The detector also suitably includes a tracking control circuit performing the function of tracking control circuit 108 in FIG. 4 and which may be of the type shown in pending U.S. application Ser. No. 483,131 of R. A. Walker, filed June 26, 1984 (now U.S. Pat. No. 3,919,697 granted Nov. 11, 1975). Alternatively, tracking circuitry of the type illustrated in my aforementioned U.S. Pat. No. 3,501,586 may be utilized, wherein motion of the light beam 110 back and forth across the rcorded track is detected. In any case, a servo output is produced on a lead 110 connected to servo mechanism driving circuitry 120 and 122 connected respectively to deflection device 84 and to motor 124 which is adapted to move scanner 12 along record medium 14 as hereinafter more fully described. The servo mechanism driving circuitry 120 controls deflection device 84 for adjusting the light beam 110 in a direction for following along the previously recorded track across the record medium 14. An integrating circuit 126 also couples servo mechanism circuitry 120 in driving relation to servo mechanism driving circuitry 122 so that an averaged or prolonged error from a predetermined beam position causes motor 124 to move the scanner 12 physically relative to scanner 10. The deflection device 84 causes the light beam 110 to follow the recorded trace in spite of small errors in recording medium motion, scanner motion, vibration, etc.

Referring particularly to FIG. 2, the scanner 12 is mounted upon a bracket 128 slideable upon fixed rails 130 which are parallel to the path of record medium 14. Motor 124 turns a feed screw 132 which engages a mating threaded portion in bracket 128, whereby rotation of the feed screw physically moves scanner 12 in a direction longitudinal of the record medium 14. Rotation of motor 124 also rotates shaft encoder 135 which indicates the location of scanner 12 relative to scanner 10.

A primary function of the apparatus as thus far illustrated is the delayed reproduction of information recorded upon medium 14. By positioning the scanner 12 along the track 130, it is possible to produce a predetermined amount of delay in reproduction, relative to recording, from substantially zero delay to delays involving several minutes or longer. Thus, if scanner 12 is moved relative to scanner 10 to nearly an abutting position, it can be seen that beam 110 can be focused on recording medium 14 at a point nearly coincident with the recording beam 55. A magnetic recording and reproduction system would not allow such latitude in regard to the timing of the reproducton because of the necessity of proximity of the magnetic writing and reading heads to the recording medium causing some minimum delay between recording and reading. In other words, the magnetic writing and reading heads cannot be located at the same place, and mechanical interference results in a necessary delay in reading what has been recorded. However, in the case of optical writing and reading, the reading beam can be directed toward substantially the same location on the medium where writing is taking place, or at any selected point thereafter.

On the other hand, the recording density is so great in the present system that relative movement of the scanner 12 away from scanner 10 produces a considerable delay. The apparatus is suitably employed for producing a desired delay in reproduction, or for reproducing information at a different rate from the rate at which the information was recorded. Thus, the scanner 12 can be gradually moved along tracks 130, under the control of the servo mechanism circuitry 122, to produce a desired output rate. The head 68 is rotated under the control of servo mechanism 134 coupled in driving relation to motor coils 66 (in FIG. 1), and responsive to an output system clock so that the scanner 12 successively scans across recorded tracks at a rate dictated by such external clock. In the short run, servo mechanism driving circuitry 130 causes deflection device 84 to keep the beam 110 on track. A contingal output from driving circuitry 120 through integrator 126 is produced as the deflection device 84 diverges continually from a "normal" position, causing servo mechanism 122 to drive the motor 124 for producing gradual movement of the scanner 12 in a desired direction. If the scanning rate of the reading scanner 12 is lower than the scanning rate of recording scanner 10, then the scanner 12 will gradually move to the left in FIG. 2, or further away from scanner 10. Generally, the length of possible movement provided will be sufficient to accommodate prolonged movement of scanner 12 without running the same mechanically too great a distance. Alternatively, a pair of systems as illustrated may be employed in the alternative so that a scanner 12 of a second overall system can take over the reading of recorded information while the scanner 12 of the first system is moved back.

The converse situation arises when the information is being read out at a faster rate than is being recorded, in which case scanner 12 will move ever closer to scanner 10. A dual system may then again be employed for reading with a second reading scanner while a first reading scanner is moved away from its recording scanner 10.

Alternatively, rather than using a plurality of complete systems, a single system can be employed which occasionally skips informaton or replays information. Thus, in the case of television recording, error can be accumulated for a complete frame. Shaft encoder 135 detects a predetermined physical movement of scanner 12 in one direction or the other, and roughly determines when one frame of error has been accumulated. Control unit 292 thereupon controls deflection device 96 to move beam 110 along the tape the distance of one recorded frame. Suitably, each scanning line across the record medium 14 comprises 25 television horizontal raster lines, so that there are 21 scanning lines across the record medium per frame in the 525 line NTSC system. For the PAL system 25 such scanning lines across the medium are involved. The scanning device 84 is servoed by way of circuitry 120 for predetermined movement in either a backward or forward direction depending upon the direction of accumulated error. The actual scanning movement to skip a frame or for the replaying of a frame may take place coincident with the end of a frame as detected by detector 114 and supplied to control unit 292. The light beam 110 will then be locked in a different track at a different position from the "normal" position for deflection device 84, and consequently, servo circuitry 120 controls servo circuitry 122 via integrator 126 for providing the reverse movement of the entire scanner 12. While skipping or replaying of only one frame is discussed, it is clear the system may skip or replay more than one frame or another predetermined body of information as desired.

This system is useful for transsyncronization, i.e., for coupling one TV signal into a system which is, say, one-half field later than the other, or with a drifting relationship therebetween. The nonsynchronized source is recorded according to its own input data clock which suitably controls the speed of rotation of scanner 10, and played back in synchronism with the desired output clock which controls servo circuitry 134, e.g. as hereinafter described in connection with the FIG. 8 circuit.

For transcoding, i.e. for converting from one television standard to another, the TV signal with the differing standard is recorded by means of scanner 10 and played back in synchronism with the desired standard by means of scanner 12. The frequency standard problems can be handled in the same manner as transsynchronization described above. For "cosmetic" purposes it may be desirable to include the circuit of FIG. 11 in output lead 116 so that lines can be repeated as desired for filling in gaps. Thus, the PAL system includes a greater number of scanning lines, and it is desired to add lines in converting from NTSC to PAL. Referring to FIG. 11, delay line 293 suitably comprises a digital register having a length to accommodate data for one TV horizontal line. Both delayed and nondelayed outputs are supplied to selector and summing circuit 294. In converting from NTSC to PAL, circuit 294 suitably selects a given line, say line 1 of a raster in nondelayed form. For output raster line 2, circuit 294 selects the sum of information form the delayed and nondelayed circuit paths. For output raster line 3 scanner 12 is directed via control circuit 292 to rescan input raster line 2 by means of changing the position of deflection device 86. Then a third input raster line is read through circuit 294 without delay. Alternatively, horizontal lines may be merely stored and repeated, or the output presentation may be altered in analog fashion.

For transcoding from PAL to NTSC, the selecting circuit 294 may be employed for deleting some horizontal lines. In order to bridge the gap caused by skipped lines, circuitry of the type illustrated in FIG. 11 may be employed for summing lines. For example, a given raster line 1 is selected by circuit 294 in nondelayed form. Input raster line 2 is skipped, and for a second output raster line, the combination of input raster line 3 and input raster line 1 as delayed are added together in circuit 294. Input raster line 4 then becomes output raster line 3 and the sequence is continued. To avoid vertical compression of the image various portions of each horizontal line may be deleted in random fashion. For this purpose, a horizontal line is stored while logical means may be employed for deleting select portions thereof.

It is desirable to change the position of deflection device 86 of scanner 12 for skipping a line so that the flow of output information is continuous despite deletion of information. Alternatively, a first in, first out memory of the type hereinafter more fully described may be employed for converting a flow of discontinuous data into a flow of continuous data. It is understood that varous approaches for cosmetic alteration of transcoded data may be employed and are understood by those skilled in the art.

The system according to the present invention is clearly useful for delaying an ordinary live television broadcast for substantially any period of time up to several minutes. This is of value in live program production, wherein the director could "preview" the broadcast a few seconds or minutes before transmission. Also, a "stop action" facility is readily obtainable with the system according to the present invention. The deflection device 84 is controlled to reread a given frame or given series of frames wherein the deflection device 84 causes nearly immediate movement of light beam 110 along the record medium 14. The deflection device is controlled from control unit 292 via servo mechanism 120 for replaying the desired portions of the tape for a period of time up to several minutes, whereby stop action or instant replay is secured. With each replay, the deflection device 84 is directed farther from its "normal" position, whereby servo mechanism 122 is commended via integrating circuit 126 to cause overall movement of scanner 12 in the direction away from scanner 10. Slower integration may be employed for this replay type of operation to prevent excessive oscillation of scanner 12 back and forth along the record medium.

The system according to the present invention may be employed for indexing and editing purposes, as when the recorded information is in digital form. The control unit 292, in such case, suitably comprises a mini-computer adapted to count and keep track of the frames on record medium 14. Servo motors 28 and 30 (in FIG. 2) operating under the control of servo mechanism circuitry 288 are suitably operated at variable speeds under the supervision of control unit 292 (in FIG. 1) for the location of certain frames and the running of the record medium at various speeds in forward and reverse directions, e.g. over the entire span of tape carried by reels 16 and 26. An editor, viewing a TV monitor or the like receiving an input from line 116, reproduces sections of the record medium at any speed, e.g. on a slot motion or frame-by-frame basis to select the exact frame which may be of interest. Each frame may be marked or premarked on the record medium with a different numerical designation, or the frames may be counted and stored in a relative manner by the computer control. When a whole program's worth of segments have been found and selected, they may be then re-indexed and played out in sequence to another recorder, suitably duplicating the apparatus of FIGS. 1-3. Each system can operate on a start-stop basis, i.e. wherein the record medium is brought up to speed within one frame time (30 milliseconds) and wherein the deflection device 84 is employed to compensate for film acceleration so that start and stop is effectively instantaneous. That is, the deflection device 84 is controlled together with motion of the record medium 14 so that the deflection device traces along the recorded track until the record medium comes up to speed.

To measure the motion of the record medium, it is desirable to provide a velocity detector 290 coupled to servo mechanism circuit 288. A velocity detector may, for example, be light sensitive and responsive to doppler frequency shift, with monochromatic light being used.

Figure 5:
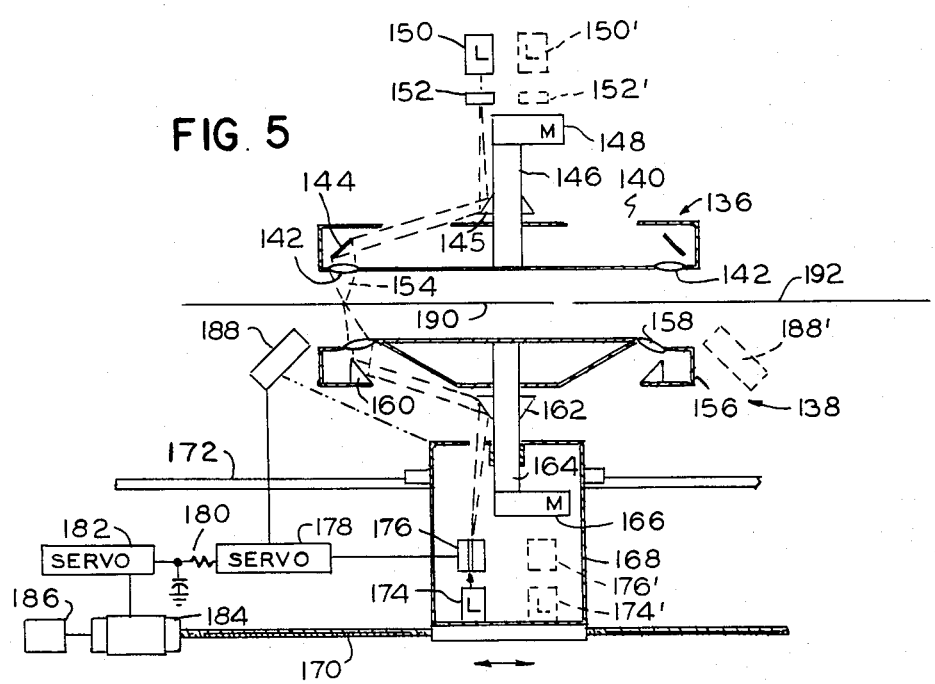
FIG. 5 is a side view, partly in cross section, of a recording and playback apparatus according to another embodiment of the present invention.

A further system according to the present invention is illustrated in FIG. 5 and includes a disc-type recording scanner 136 and a disc-type reading scanner 138 disposed on opposite sides of a record medium which may comprise film or a plurality of plates 190, 192 adapted to have information recorded thereon in substantially the same manner as record medium 14 in the previous embodiment. However, in this embodiment the recording tracks across the medium will be arcuate shaped rather than substantially straight lines as in the case of the previous embodiment. Scanner 136 comprises a disc portion 140 carrying a plurality of objective lenses 142 evenly spaced around the periphery thereof, and internal mirrors 144 for directing a light beam from laser 150 onto the record medium, forming beam 154 at the record medium. The scanner 136 further comprises a shaft 146 carrying disc portion 140 and rotated by motor 148. Shaft 146 is provided with distributor mirrors 145 positioned about the shaft so each such mirror will pick up the light beam from the laser and direct the same to one of the lenses 142 by way of intervening mirror 144. A modulator 152 is supplied with an input signal. The mirrors 142 then successively record tracks across the record medium as shaft 146 is turned by motor 140.

The information recorded on medium 190, 192 is read out by scanner 138, such scanner including a disc-shaped portion 156 supported by a shaft 164 and rotatable by means of motor 166. Disc-shaped portion 156 is provided with a plurality of lenses 158 near the periphery thereof adapted for projecting a reading beam onto the record 190, 192, such beam orginating in laser 174 and passing through deflection device 176 to one of the set of distributor mirrors 162 which rotate with shaft 164. The mirrors 162 successively reflect the laser beam through one of the lenses 158 via mirrors 160. Deflection device 176 is suitably of the type illustrated in FIG. 4.

The scanner 138 is supported for rotation by housing 168 containing motor 166 as well as laser 174 and deflection device 176. Housing 168 is movable along rails 172 through operation of the feed screw 170 rotated by motor 84 and having a threaded connection with the housing 168. A detector 188 is attached to housing 168 for movement therewith, and in addition to providing an output of the recorded information the detector provides an input for servo mechanism circuitry 178 having a control relation with deflection device 176. Moreover, an integrating circuit 180 couples the servo mechanism circuitry 178 to servo mechanism circuitry 182 for rotating motor 184, thus moving housing 168, as necessary, for keeping scanner 130 "on track". Motor 184 is further provided with a shaft digital encoder 186 for supplying feedback, and the system operates in substantially the same manner as the previous embodiment, including further control circuitry as may be employed in conjunction therewith as in the case of previous embodiment.

The FIG. 5 embodiment may be further provided with an input laser 150' and an input modulator 152' on the opposite side of the axis of scanner 136 from elements 150 and 152. Scanner 138 can be similarly supplied with an additional laser 174' deflected through operation of deflection device 176'. Moreover, an additional detector 188' may be provided. by switching between the recording and playback lasers, recording and reading scans be switched from a first record medium or plate 190 to a second record medium plate 192 without interruption, thereby accomplishing continuous recording and playback with a fixed plate machine. Of course, when reading is accomplished at a delayed time after recording, the readout laser will be switched after the recording laser.

Figure 6:
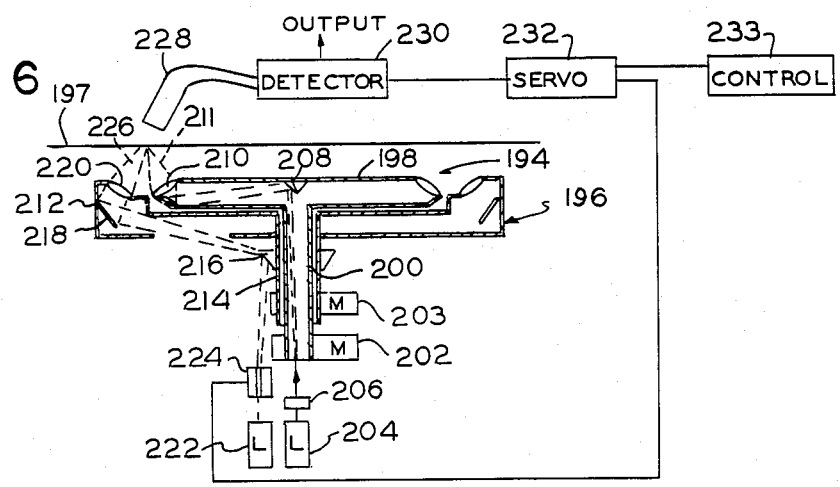
FIG. 6 is a side view, partially in cross section, of yet another embodiment of the recording and playback apparatus according to the present invention.

A further embodiment according to the present invention is illustrated in FIG. 6 and includes coaxial recording and readout scanners 194 and 196, respectively. Scanner 194 includes an upper disc portion 198 provided with objective lenses 210 near the periphery thereof and a pyramidal mirror 208 for reflecting light from laser 204 to a respective lens 210 scanning a record medium 197. The light from laser 204 is modulated by modulator 206 and passes through the hollow shaft 200 of scanner 194, the shaft being rotated by a motor 202. Reading scanner 196 comprises upper disc portion 212 carrying lenses 220 near the periphery thereof which receive light from laser 222 passing through deflection device 224 (suitably of the FIG. 4 type) and reflected by distributor mirror 216 carried by shaft 214 to one of lenses 220 via a mirror 218. The shaft 214, supporting disc portion 212, is rotated by motor 203. Lenses 220 form a reading beam 226 and the light passing through the record medium 197 is collected by fiber optic device 220 leading to a detector 230 for providing an output. The detector further operates servo mechanism 232 which in turn controls deflection device 224 as hereinbefore described.

Instead of employing a single record medium 197, multiple record mediums or plates may alternatively be employed in the embodiment of FIG. 6, as were disclosed at 190 and 192 in the FIG. 5 embodiment. The FIG. 6 structure may be modified to provide a further set of recording and playback lasers in a manner analogous to the additional lasers shown in FIG. 5 for accomplishing continuous recording and playback with a fixed plate machine.

Since the scanners of the FIG. 6 embodiment are coaxial, substantially no relative physical movement is permitted between the two scanners. However, deflection device 224 is suitably controlled by control means 233 such that the reading beam reads the recorded track with a predetermined delay subsequent to recording thereof, or so that reading takes place at a different rate from recording. Of course, the delay possible is somewhat more limited in this embodiment, but this embodiment is more compact than the FIG. 5 embodiment.

It will be understood that the operation of the deflection means, detector and control means as well as the various functional atributes of the embodiments of FIG. 5 and FIG. 6 are suitably substantially the same as described in connection with the embodiment of FIGS. 1 through 3.

Because of mechanical imperfections, it is desirable to provide an "overscan" on each side of the record medium, for example the tape record medium illustrated at 14 in FIG. 1. This means that the data recorded is recorded in parallel lines, raster-fashion across the tape, but the ends of the lines do not coincide with the edges of the tape, nor does each line have to be exactly juxtaposed with respect to the next. In FIGS. 7 and 8 there is illustrated circuitry for receiving a continuous stream of data (in FIG. 7) which is broken up and segmentally time compressed into scanning lines across the tape with a slight gap between each scanning line and the next. Thus, each segment of information is speeded up with respect to time, or compressed, so that there are gaps in time between the segments. When the information is retrieved or read out, the information is expanded so the gaps are no longer present.

Referring to FIG. 9, the recording of television information is illustrated wherein a complete horizontal TV line is illustrated at 264 including digitized information indicated at 265. Horizontal blanking pulses are indicated at 266. An overscan gap is illustrated at 268 and may (in some instances) constitute the vertical blanking period. It will be noted that a given line for a scan of information across the tape comprises the plurality of television raster lines.

Referring to FIG. 10, there is illustrated a record medium 14 in the form of a tape which is substantially transparent except for a multiplicity of recorded lines or tracks 284 as may be recorded thereupon by scanner 10 illustrated in FIGS. 1-3. As hereinbefore mentioned, the recorded information may actually be in the form of digital spots which are closely spaced in line. Also, the scanning lines or tracks 284 are very closely spaced, as hereinbefore mentioned. The lines or scans are scanned across the tape raster fashion by successive lenses 38, wherein a line is diagonal across the tape inasmuch as the tape is moving as the scanning takes place. The start of the next scan is then nearly directly across the tape from the conclusion of the immediately preceding scan. Therefore, tracking apparatus employed in readout will easily locate each next following scan. The overscan gap corresponds to the short time between the conclusion of a given scan across the tape and the start of the next scan.

Referring to FIG. 7, data input and an input clock are provided to a first in, first out memory 234 which may comprise a plurality of Fairchild 3341 MOS integrated circuits connected in parallel. The memory 234 is reset from and-gate 238 when the latter receives a horizontal sync pulse, a vertical sync pulse, and a scanner start indication from control circuitry indicating that the scanning beam is substantially at the beginning of a digital scanning line as hereinafter more fully described. Likewise up-down counter 236 is reset. Now during the overscan gap, or the gap recording lines across the tape, input information is fed into memory 234 on the data-in line at a rate determined by the input clock. At the same time, up-down counter 236, which receives the memory in clock and out clock, is counted upwardly. However, no information is read out of memory 234 at this time until up-down counter 236 counts up to a "full" condition (indicating a full memory) at which time counter 236 triggers flip-flop 240 to an "on" condition for enabling and-gate 244. Thereupon, clock signals from clock generator 242 coupled through gate 244 causes memory 234 to provide a data output signal to the recorder, i.e. to lead 56 in FIG. 1, for example. It will be understood that the rotation of head 36 is controlled so that a recording beam 55 from one of the lenses 38 will be just inside the margin of recording medium 14 at this time. Thus, the scanner start signal for gate 238 is suitably derived from a detector 286 (see FIG. 2) responsive to indicia provided on head 36 for energizing gate 238 at the start of the overscan, i.e. when the position of scanning beam 55 is at the position where data would ordinarily start without time compression. This position also corresponds to the conclusion of the just previous scanning line 284. The record motor speed is locked to the input clock.

During the scanning line, the output of clock generator 242 via gate 244 is fed to up-down counter 236 for counting down the latter until the empty condition is registered for thereby indicating a now empty condition for memory 234. At this time, flip-flop 240 is turned off, whereby gate 244 is no longer enabled and another overscan gap occurs. The output of clock generator 242 is also supplied to divide-by-N counter 250 by way of gate 248, wherein N equals the number of clock bits per scanning line across the tape. This is also the number of bit positions in a line in the instances of digital recording. Therefore, counter 250 will count out during a line and provide an output to phase lock detector 246 at the end of a line. The output of counter 250 will also turn off the counter input via an inhibiting terminal of gate 248. At the same time, since memory 234 will "run out" at the end of a line, up-down counter 236 will provide an empty signal to phase lock loop detector 246 at the end of a line. If the pulse edges of the two counters providing inputs to phase lock detector 246 not coincident, the phase lock loop provides an analog signal for adjusting clock pulse generator 242 to the proper frequency so the correct phase is attained at the end of each line whereby a desired overscan gap and a desired data flow are produced. It will be noted that counter 250 is reset by the "full" output from up-down counter 236, indicative of the start of a scanning line.

Referring to FIG. 8, circuitry is illustrated for reading out the scanning lines having the overscan gap therebetween, and providing a continuous output as required for audio, video and the like purposes. The data input is supplied from a playback detector, for example from detector 114 in FIG. 1 via line 116. The input data clock 272 is synchronized with data from the record, i.e. input data clock 272 is also connected to receive a synchronizing signal from detector 114, for example. The readout clock signal supplied to memory 252 as well as to up-down counter 280 is suitably derived from a standard, such as a color TV receiver color reference crystal.

Memory 252 is suitably a first in, first out memory similar to memory 234 in FIG. 7. In addition to data from the playback detector being supplied to memory 252, the same is also coupled to a data start detector comprising diode 254 coupled to the input of an amplifier 262, wherein the amplifier input is shunted to ground by a parallel combination of capacitor 256 and resistor 258 providing an integrating function. A second or differential input of amplifier 262 is connected to the adjustable tap of a potentiometer 260, end points of which are connected to appropriate voltages for adjusting the detection level of the circuit. The cathode of diode 254 is connected to the amplifier input whereby the positive going signal excursion at the end of overscan gap 268 in FIG. 9 produces an output from amplifier 262 which resets flip-flop 270. The input and the output of amplifier 262 stay "up" for the duration of the scanning line, until the next overscan gap 268 is encountered at which time amplifier 262 will be back biased according to the setting of potentiometer 260. The charge on capacity 256 is dissipated in resistor 258 and the circuit awaits the positive excursion at the end of the gap.

At the start of data, the output of amplifier 262 resets memory 252 and counters 278 and 280 as well as flip-flop 270. Flip-flop 270 enables and-gate 274 which thereupon couples clock pulses from clock generator 272 into the memory such that input data is read into the same. During the scanning line, information is being fed into memory 252 faster than it is being read out, and counter 280 which receives the in clock and out clock from the memory detects when the memory is full, thereupon providing an output to phase lock detector 282. Also, during the scanning line, divide-by-N counter 278, which receives the signal from clock generator 272 by way of gate 276, counts the number of clock bits per scanning line and provides an output to the phase lock detector 282 at the end of the line, while also turning off its input via an inhibiting terminal of gate 276. If the pulse edges of the outputs of the two counters feeding phase lock detector 282 are not coincident, the phase lock loop produces an analog voltage to adjust the motor speed for playback, via servo 134 in FIG. 1, for example, so that data will be supplied at just the right rate for supplying a constant output from the circuit on the data out line.

When an overscan gap is used, as described above, the gap period may be employed for placing index marks on the edge of the tape for detection by detector 290. If such index marks are provided with a light beam, then the detector 290 suitably comprises a light source, for example a laser, and photodetector means. As hereinbefore indicated, the index marks provided are useful for editing functions.

The described system of FIGS. 7 and 8 for compressing and expanding data is principally useful in that the position of the record in the direction of the data lines becomes much less critical. This problem is not confined to apparatus for simultaneous recording and reading of delayed data, but is also of importance, for example, in regard to apparatus using the same scanner at different times for recording and reading, and is applicable to this type of recording in general. Thus, if continuous information such as a television raster is divided up into separate segments for recording, the system prevents loss of information and alleviates synchronization problems.

Figure 12:
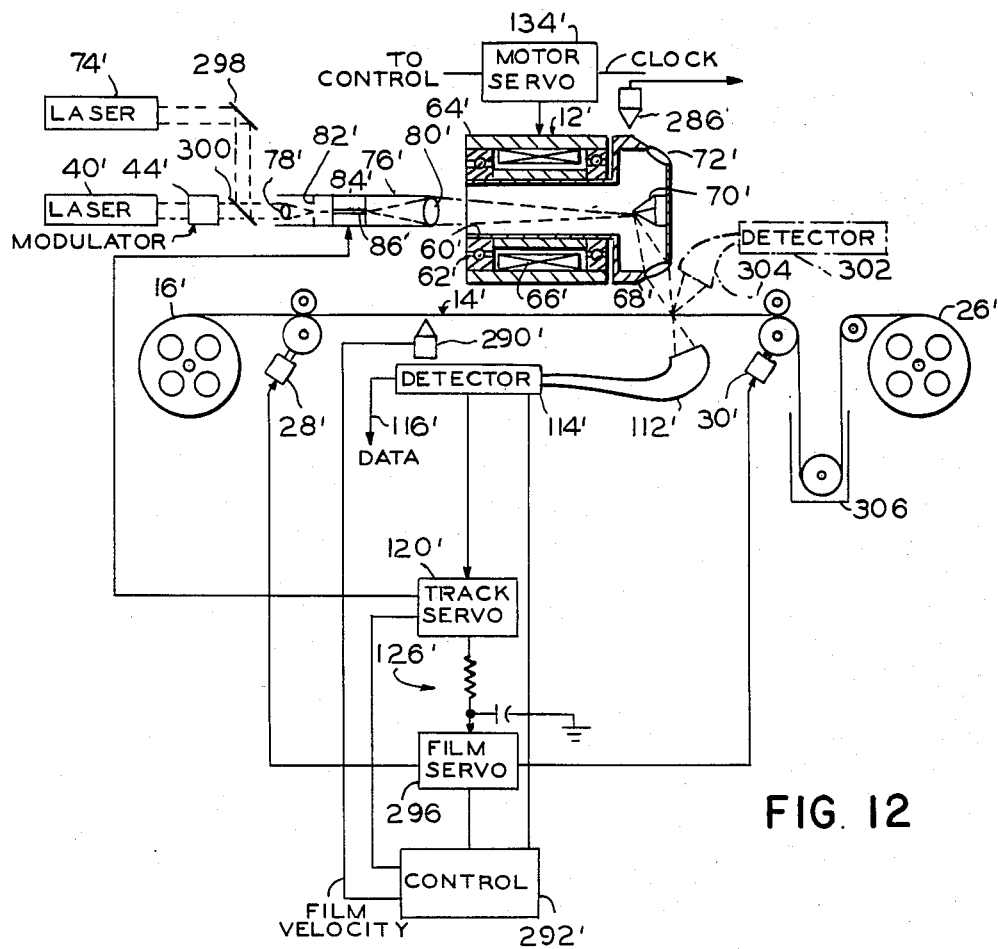
FIG. 12 is a schematic side view, partially is cross section of appartus according to yet a further embodiment of the present invention.

FIG. 12 illustrates an embodiment of the present invention employing the same scanner 12' for both recording and reading information relative to record medium 14' suitably comprising a tape which is unreeled from reel 16' and received onto pickup reel 26'. The record medium is again self-developing. In the particular example illustrated, thermal treatment is contemplated wherein the record medium passes through an oven 306 after information has been recorded thereon, and therefore the record medium in this particular instance may be of the dry silver or free-radical type. Other types of record medium may be substituted therefore, for example as hereinbefore described.

Scanner 12' and the associated elements are substantially similar to scanner 12 as hereinbefore described with reference to the embodiment of FIGS. 1 and 2. Briefly, scanner 12' comprises a cylinder 60' journaled in bearings 62' secured to an outer cylindrical member 64' which also supports motor coils 66'. A head 68' supports pyramidal mirror 70' at the forward end thereof for directing light through a plurality of evenly spaced objective lenses 72' positioned around the forward angular wall of the head.

Lasers 40' and 74' are alternately employed to direct beams of light through an optical tube 76' disposed along the axis of scanner 12' and including lenses 78' and 80' and a pinhole aperture 82' located therebetween. Lens 80' directs the beam from the pinhole aperture to the pyramidal mirror 70' for successively directing the light beam toward the particular objective lens 72' which is tracing across the record medium 14'. Laser 40' is utilized for recording purposes, and the light thereof passes through a modulator 44' to which the intelligence to be recorded is applied, and from the modulator, the light beam passes through half silvered mirror 300 through the aforementioned optical tube 76'. A reading laser 74' directs a laser beam of lesser strength toward mirror 298 which reflects the same to mirror 300 and from there down the axis of the optical tube 76'. The beam of light from laser 16' is capable of reading information from medium 14', but not rewriting further information. Deflection device 84' is housed between the pinhole aperture 82' and lens 80', with such deflection device suitably being of substantially the same type as device 84 hereinbefore described in respect to previous embodiments. This device is moved only during reading operations.

In the case of recording, lens 80' directs light from the pinhole upon pyramidal shaped mirror 70' and through lenses 72' for scanning across the recording medium 14' whereby information may be recorded. Device 84 is controlled to remain in a predetermined axial position. For subsequently reading back the recorded information, laser 40' is switched off while laser 74' is rendered operative. The recording medium 14' is backed up and then driven past the scanner in the forward direction for reading the recorded information. As the beam tracks along the line or track of recorded information, a variable amount of light will be transmitted through the record medium 14' and is picked up by fiber optic collector tube 112'. Tube 112' extends under the path of the light beam and conveys the light to detector 114' which includes photoelectric means for supplying an output at 116'. Detector 114' suitably includes tracking control circuitry performing the function of tracking control circuit 108 in FIG. 4. A servo output is produced in response to tracking control for application to servo mechanism driving circuitry 120' which in turn controls deflection device 84' for adjusting the position of the reading light beam in a direction for following along the previously recorded track across the record medium 14'. An integrating circuit 126' couples servo mechanism circuit 120 in driving relation to servo mechanism driving circuit 296 so that an averaged or prolonged error from a predetermined beam position adjusts the speed of record medium transport whereby deflection device 84' can function within proper limits. The deflection device 84' causes the reading light beam to follow the recorded trace in spite of small errors in recording medium motion, scanner motion, vibration, etc.

Tape transport motors 28' and 30' are operated at a predetermined average speed under the direction of control unit 292' via servo mechanism circuitry 296. Velocity feedback is provided from detector 290' which is positioned along the recording medium for suitably ascertaining the recording medium velocity, for example, in a manner hereinbefore described with respect to detector 290. The velocity information is supplied as feedback to servo mechanism circuit 296 by way of control unit 292' from which the desired speed is selected. This speed is then momentarily increased or decreased in response to the input from circuit 120' via integrator 126' for aiding in tracking the desired information on the record medium. Alternatively, the scanner 12' can be made movable in the manner illustrated in FIG. 2, and responsive to tracking information in the manner described in connection with the embodiment of FIG. 2.

In initially recording information, the scanner 12' is suitably rotated via servo mechanism circuitry 134' connected to motor coil 66' for substantially synchronizing the scanner rotation with the input clock. The circuitry of FIG. 7 is employed for providing an "overscan" gap, with detector 286' supplying scanner position information for gate 238 in FIG. 7 as hereinbefore described with respect to a previous embodiment. The data out lead in FIG. 7 suitably drives modulator 44' in FIG. 12 via an intermediate amplifier (not shown). For reading out recorded information, the detector output on lead 116' is connected to the data in terminal in FIG. 8. Servo circuit 134' is then controlled from phase lock detector 282 in FIG. 8.

In addition to the readout of recorded information in a straightforward manner, the FIG. 12 system may be employed in the readout mode for editing and the like as hereinbefore described with respect to previous embodiments. The motion of the film via servo circuitry 296 is controlled to minimize offset of deflector device 84', but the deflector device is employed to compensate for acceleration conditions of the recording medium.

Instead of detector 114' and light collector tube 112' is the FIG. 12 embodiment, responsive to light through a transmissive recording medium, a detector 302 provided with a light collector tube 304 may be employed, i.e. if the recording medium is reflective.

While the embodiment of FIG. 12 illustrates a single scanner of the cylindrical type employed for both recording and reading of information, it is clear the disc type scanners of FIG. 5 and FIG. 6 may be similarly adapted, for example, the scanner 138 in the lower portion of FIG. 5 may be so used, with provision for a more powerful laser for recording. A transmission detector for readout may also be empoyled, for example a detector substantially similar to detector 230 in the FIG. 6 embodiment provided with a fiber optic device 228. When individual record plates are utilized, a separate oven may be employed for developing such plates.

In the case of either the single scanner or double scanner embodiments, the overscan gap circuit of FIG. 7 need not always be empoyled to provide the gap, and only the output circuit of FIG. 8 is then employed. For example, if a television signal is being recorded, the television camera scan can be controlled so that it sweeps slightly faster than normal for 25 lines and then stops for a time gap. Alternatively, a delay means (not shown) can be employed to store the first half of a given digital line which is then recorded simultaneously with the second half, i.e. spatially multiplexed. Of course, if the recorded data is not time related or continuous, e.g. in the case of computer data, the overscan gaps may be inserted without use of a first in, first out memory.

In the case of the double scanner embodiments, i.e. where separate scanners are employed for writing and reading out information, the effect of an overscan gap can be produced in a different manner without the compression circuit of FIG. 7. Recording is accomplished by means of the recording scanner, without compression of the information. The playback scanner for reading such information then suitably has a larger diameter than the recording scanner whereby a longer scan is produced. In other words, the line of recorded information, across the recording medium, is scanned more rapidly than it was recorded, effectively leaving gaps between each scanned line so far as the readout signal is concerned. Then, this information can be expanded by employing the circuit of FIG. 8.

In regard to recording of digital information on scanning lines on the recording medium of the present invention, it is apparent that such lines may be composed either of opaque spots on an otherwise transparent recording medium, or of transparent spots on an otherwise opaque recording medium.

While I have shown and described several embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. Recording and reproducing apparatus comprising:
   a record medium capable of receiving and recording electro-magnetic information,
   a first optical scanner positioned in juxtaposition with said record medium for directing a beam of electro-magnetic radiation toward said record medium via a first radiation path scanned by said scanner substantially across said record medium along a track extending substantially crossways of said record medium, and means for modulating said beam to record information on said track,
   means for producing relative movement between said first scanner and said record medium so that said first scanner in scanning crossways of said record medium records said track in substantially parallel segments across said record medium,
   a second concurrently operating optical scanner independent from the first optical scanner and positioned along said record medium in juxtaposition therewith and in spaced relation from said first scanner for scanning along said track crossways of said record medium via a second radiation path to read informaton recorded on said track a predetermined time after the same has been recorded, with a delay determined by the spacing between said first and second radiation paths,
   means for also producing relative movement between said second scanner and said record medium,
   low inertia optical deflection means for deflecting said second radiation path relative to said second scanner in a direction along the record medium substantially independently of scanning along said track to produce a rapid movement of said second radiation path as compared with said relative movement between said second scanner and said record medium,
   and detector means receiving the output produced via said second radiation path for energizing said deflection means to deflect said second radiation path rapidly toward the track being read in response to detection of said track.

2. The apparatus according to claim 1 wherein said detector means is also coupled in energizing relation to said means for producing relative movement between said second scanner and said record medium.

3. The apparatus according to claim 2 wherein said means for producing relative movement between said second scanner and said record medium comprises means for moving said second scanner relative to said record medium, said second scanner being reponsive to said detector means in its movement along said medium for bringing about predetermined alignment between said second radiation path and said track in cooperation with said deflection means.

4. The apparatus according to claim 3 further including integrating circuit means at the input of said means for moving said second scanner for slowing the response thereof to said detector so that said deflection means produces short term alignment between said second radiation path and said track while said means for moving said second scanner produces longer term alignment between said second radiation path and said track.

5. The apparatus according to claim 1, wherein said record medium comprises a photosensitive tape.

6. The apparatus according to claim 1 wherein said record medium comprises a photosensitive plate.

7. The apparatus according to claim 1 including means for causing said first and second optical scanners to scan at first and second scanning speeds.

8. The apparatus according to claim 1 wherein said scanners provide said first and second radiation paths in directions along said record medium forward of each said scanner in the direction of the remaining scanner to provide a range of delay between said scanners governed by the spacing of said radiation paths down to zero delay when the radiation paths are coincident upon said record medium without mechanical interference between said scanners.

9. The apparatus according to claim 1 wherein said means for modulating said beam is provided with digital information to produce a track of information on said record medium comprising a series of digitally encoded spots on said medium recorded and read out in serial fashion across said record medium.

10. The apparatus according to claim 1 wherein said first and second optical scanners comprise first and second rotatable means disposed along said record medium for scanning said first and second radiation paths substantially across said record medium.

11. The apparatus according to claim 10 wherein said first and second optical scanners comprise disc members, each said disc member being provided with a plurality of spaced peripheral lenses for succesively scanning a said radiation path substantially across said record medium.

12. The apparatus according to claim 11 wherein one of said scanners is positioned on one side of said record medium and the remaining scanner is positioned on the opposite side of said record medium.

13. The apparatus according to claim 11 wherein said scanners are positioned on the same side of said record medium and are driven by coaxial shafts.

14. The apparatus according to claim 1 wherein said first and second optical scanners are cylindrical and substantially aligned along a common cylindrical axis, each said scanner being provided with a plurality of spaced peripheral lenses for successively scanning a radiation path across said record medium as the scanner rotates.

15. The apparatus according to claim 14 further having means for providing a central path of electro-magnetic radiation axially along a said scanner, and central mirror means internally fixed to said scanner for directing electro-magnetic radiation successively through a lens scanning across said record medium.

16. The apparatus according to claim 14 wherein said lenses are positioned proximate ends of said cylindrical scanners closest the remaining scanner and are angularly oriented to scan said first and second light paths forward of the respective scanner and at an angle with respect to the record medium to provide a range of delay between said scanners governed by the spacing of said light paths down to zero delay without mechanical interference between said scanners.

17. The apparatus according to claim 1 including a source of radiation for said second radiation paths, said optical deflection means being disposed between said source of radiation and said second optical scanner.

18. The apparatus according to claim 1 further including means for providing input information for said first optical scanner in segments corresponding to parallel scan segments across said record medium, and circuit means for receiving recorded information as read by said second optical scanner and for expanding the information to produce a substantially continuous flow thereof.

19. The apparatus according to claim 1 further including circuitry for compressing input information for said first optical scanner into scan lines for recording across said tape with gaps therebetween corresponding to the changeover from one track segment to the next, said input information being compressed on a time scale to provide the same information at a faster rate, and circuit means for receiving recorded information as read by said second optical scanner for expanding the information to provide a substantially continuous flow thereof substantially corresponding to the information as originally recorded.

20. The apparatus according to claim 1 wherein said means for producing relative movement between said second scanner and said record medium is controllable for bypassing part of the information on said record medium.

21. The apparatus according to claim 1 wherein said means for producing relative movement between said second scanner and said record medium is controllable for re-scanning at least a part of the information on said record medium.

22. The apparatus according to claim 1 wherein said detector is secured to said second scannar for simultaneous movement therewith along said record medium, said detector being adapted to receive electro-magnetic radiation from said second scanner via said record medium.

23. Recording and reproducing apparatus comprising:
- a record medium capable of receiving electro-magnetic information recorded substantially thereacross in a plurality of tracks extending substantially crossways of said record medium,
- an optical scanner for reading the recording as recorded on said record medium, said optical scanner being disposed in juxtaposition with said record medium for scanning a path of elctro-magnetic radiation along said tracks substantially crossways of said record medium,
- means for providing a beam of electro-magnetic radiation to said optical scanner and means for modulating said beam of electro-magnetic radiation for selectively recording said information on said record medium in said plurality of tracks as said optical scanner scans thereacross,
- means for producing relative movement between said optical scanner and said record medium in a direction longitudinal of said record medium,
- low inertia optical deflection means for deflecting said radiation path relative to said scanner in a direction longitudinal of said record medium substantially independently of said scanning along said track to produce movement of said radiation path which is rapid as compared with said relative movement between said scanner and said record medium,
- and detector means receiving an output produced via said radiation path for energizing said deflection means to deflect said radiation path rapidly toward the track being read in response to detection of said track.

24. Recording and reproducing apparatus comprising:
- an elongate record medium in the form of a photosensitive tape and means for driving said tape in a direction longitudinal thereof,
- a source of electro-magnetic radiation,
- an optical scanner positioned adjacent the path of said tape, said scanner being disposed in juxtaposition with said tape and including a rotatable head mounting a plurality of lenses for successively scanning a path of said electro-magnetic radiation across said tape according to a plurality of information bearing tracks extending crossways of said tape, each track comprising a series recorded plurality of small closely spaced information spots representing digital bits, wherein each track across said tape is scanned by one of said lenses and each track contains a discrete number of information spots with their being a gap in digital information as between tracks,
- said source of electro-magnetic radiation including a first laser operative during recording for selectively providing electro-magnetic radiation of a first strength along said path for recording said plurality of information bearing tracks on said tape, and a second laser providing weaker radiation along said path for selectively reading information from said tape,
- low inertia optical deflection means for deflecting said radiation path relative to said scanner in a direction along the tape crossways of said tracks for producing rapid movement of said radiation path as compared with said longitudinal movement of said tape,
- detector means receiving outputs from said tracks via said radiation path, including means for energizing said low inertia optical deflection means to deflect said radiation path toward a track in response to detection of that track for providing shot-term alignment between the radiation path and such track,
- integrating circuit means also coupling said detector means to said means for driving said tape for changing the drive speed of said tape to produce long-term alignment between said radiation path and tracks being read,
- and means for receiving successive outputs from said detector means representative of successive tracks and for combining said successive outputs into a substantially continuous stream of digital output information.

25. Recording and reproducing apparatus comprising:
- an elongate record medium in the form of a photosensitive tape and means for driving said tape in a direction longitudinal thereof,
- a source of electro-magnetic radiation,
- an optical scanner positioned adjacent the path of said tape, said scanner being disposed in juxtaposition with said tape and including a rotatable head mounting a plurality of lenses for successively scanning a path of said electro-magnetic radiation across said tape according to a plurality of information bearing tracks extending crossways of said tape, each track comprising a series recorded plurality of small closely spaced information spots representing digital bits, wherein each track across said tape is scanned by one of said lenses and each track contains a discrete number of information spots with there being a gap in digital information as between tracks,
- means for selectively modulating said source of electro-magnetic radiation with digital information for causing said electro-magnetic radiation to produce said spos representing digital bits on said tape,
- low inertia optical deflection means for deflecting said radiation path relative to said scanner in a direction along the tape crossways of said tracks for producing rapid movement of said radiation path as compared with said longitudinal movement of said tape,
- detector means receiving outputs from said tracks via said radiation path, including means for energizing said low inertia optical deflection means said radiation path toward a track in response to detection of that track for providing short-term alignment between the radiation path and such track,
- integrating circuit means also coupling said detector means to said means for driving said tape for changing the drive speed of said tape to produce long-term alignment between said radiation path and tracks being read,
- and means for receiving successive outputs from said detector means representative of successive tracks and for combining said successive outputs into a substantially continuous stream of digital output information.

26. Recording and reproducing apparatus comprising:
- an elongate record medium in the form of a photosensitive tape, the tape having a plurality of information bearing tracks extending crossways of said tape, each track comprising a series recorded plurality of small closely spaced information spots representing digital bits wherein each track contains a discrete number of information spots with there being a gap in digital information as between tracks, and means for driving said tape in a direction longitudinal thereof,
- a source of elctro-magnetic radiation,
- an optical scanner positioned adjacent the path of said tape, said scanner being dispoed in juxtaposition with said tape and including a rotatable head mounting a plurality of lenses for successively scanning a path of said electro-magnetic radiation across said tape according to the plurality of information bearing tracks extending crossways of said tape, wherein each track across said tape is scanned by one of said lenses,
- said source of electro-magnetic radiation including a first laser operative during recording for providing electro-magnetic radiation of a first strength along said path for recording said information bearing tracks on said tape, and a second laser providing weaker radiation along said path for reading said information bearing tracks,
- low inertia optical deflection means for deflecting said radiation path relative to said scanner in a direction along the tape crossways of said tracks for producing rapid movement of said radiation path as compared with said longitudinal movement of said tape,
- detector means receiving outputs from said tracks via said radiation path, including means for energizing said low inertia optical deflection means to deflect said radiation path toward a track in response to detection of that track for providing short-term alignment between the radiation path and such track, means for producing relative movement between said scanner and said tape, integrating circuit means also coupling said detector means to said means for producing relative movement for changing the relative position between said scanner and said tape to produce long-term alignment between said radiation path and tracks being read, and means for receiving successive outputs from said detector means representative of successive tracks and for combining said successive outputs into a substantially continuous stream of digital output information.

27. Recording and reproducing apparatus comprising:

an elongate record medium in the form of a photosensitive tape, the tape having a plurality of information bearing tracks extending crossways of said tape, each track comprising a series recorded plurality of small closely spaced information spots representing digital bits wherein each track contains a discrete number of information spots with there being a gap in digital information as between tracks, and means for driving said tape in a direction longitudinal thereof, a source of elctro-magnetic radiation, including means for selectively modulating said source of electro-magnetic radiation with digital information for causing said electro-magnetic radiation successively to produce said spots representing digital bits on said tape, an optical scanner positioned adjacent the path of said tape, said scanner being disposed in juxtaposition with said tape and including a rotatable head mounting a plurality of lenses for successively scanning a path of said elctro-magnetic radiation across said tape according to the plurality of information bearing tracks extending crossways of said tape, wherein each track across said tape is scanned by one of said lenses, low inertia optical deflection means for deflecting said radiation path relative to said scanner in a direction along the tape crossways of said tracks for producing rapid movement of said radiation path as compared with said longitudinal movement of said tape, detector means receiving outputs from said tracks via said radiation path, including means for energizing said low inertia optical deflection means to deflect said radiation path toward a track in response to detection of that track for providing short-term alignment between the radiation path and such track, means for producing relative movement between said scanner and said tape, integrating circuit means also coupling said detector means to said means for producing relative movement for changing the relative position between said scanner and said tape to produce long-term alignment between said radiation path and tracks being read, and means for receiving successive outputs from said detector means representative of successive tracks and for combining said successive outputs into a substantially continuous stream of digital output information.

* * * * *

UNITED STATES PATENT AND TRADEMARK OFFICE
CERTIFICATE OF CORRECTION

PATENT NO. : 4,495,609

DATED : January 22, 1985

INVENTOR(S) : JAMES T. RUSSELL

It is certified that error appears in the above-identified patent and that said Letters Patent is hereby corrected as shown below:

Column 1, line 64 "thus" should be --then--;

Column 2, line 30 "prtially" should be --partially--;

Column 3, line 14 "futher" should be --further--;

Column 3, line 22 "motor" should be --rotor--;

Column 3, line 45 after "Each" insert --one--;

Column 3, line 54 "firm" should be --film--;

UNITED STATES PATENT AND TRADEMARK OFFICE
CERTIFICATE OF CORRECTION

PATENT NO. : 4,495,609

DATED : JANUARY 22, 1985

INVENTOR(S) : JAMES T. RUSSELL

It is certified that error appears in the above-identified patent and that said Letters Patent is hereby corrected as shown below:

Column 3, line 57 "a" should be --A-- ;

Column 4, line 54 "98" should be --92-- ;

Column 5, line 14 "1984" should be --1974-- ;

Column 5, line 18 "rcorded" should be --recorded-- ;

Column 5, line 20 "110" should be --118-- ;

Column 6, line 18 "130" should be --120-- ;

Column 6, line 19 "contingal" should be --continual-- ;

UNITED STATES PATENT AND TRADEMARK OFFICE
CERTIFICATE OF CORRECTION

PATENT NO. : 4,495,609

DATED : JANUARY 22, 1985

INVENTOR(S) : JAMES T. RUSSELL

It is certified that error appears in the above-identified patent and that said Letters Patent is hereby corrected as shown below:

Column 6, line 51 "96" should be --86--;

Column 7, line 35 "form" should be --from--;

Column 7, line 57 "select" should be --selected--;

Column 8, line 39 "slot" should be --slow--;

Column 9, line 36 "84" should be --184--;

Column 9, line 45 "130" should be --138--;

UNITED STATES PATENT AND TRADEMARK OFFICE
CERTIFICATE OF CORRECTION

PATENT NO. : 4,495,609
DATED : JANUARY 22, 1985
INVENTOR(S) : JAMES T. RUSSELL

It is certified that error appears in the above-identified patent and that said Letters Patent is hereby corrected as shown below:

Column 10, line 18 "220" should be --228-- ;

Column 11, line 34, after "gap" (second occurrence) insert --between-- ;

Column 12, line 1 "instances" should be --instance-- ;

Column 12, line 64 "line" should be --lines-- ;

Column 14, line 1 "16" should be --74-- ;

Column 15, line 15 "is" should be --in-- ;

UNITED STATES PATENT AND TRADEMARK OFFICE
CERTIFICATE OF CORRECTION

PATENT NO. : 4,495,609

DATED : JANUARY 22, 1985

INVENTOR(S) : JAMES T. RUSSELL

It is certified that error appears in the above-identified patent and that said Letters Patent is hereby corrected as shown below:

Column 18, line 44 of claim 23

"elctro-magnetic" should be --electro-magnetic-- ;

Column 20, line 7 of claim 25 "spos" should be --spots-- ;

Column 20, line 16 of claim 25 after "deflection means" insert --to deflect-- ;

UNITED STATES PATENT AND TRADEMARK OFFICE
CERTIFICATE OF CORRECTION

PATENT NO. : 4,495,609
DATED : JANUARY 22, 1985
INVENTOR(S) : JAMES T. RUSSELL

It is certified that error appears in the above-identified patent and that said Letters Patent is hereby corrected as shown below:

Column 20, line 44 of claim 26 "dispoed" should be --disposed-- ;

Column 22, line 5 of claim 27 "elctro-magnetic" should be --electro-magnetic-- ;

Signed and Sealed this

Tenth Day of September 1985

[SEAL]

*Attest:*

DONALD J. QUIGG

*Attesting Officer*  *Acting Commissioner of Patents and Trademarks - Designate*